US010211905B2

(12) United States Patent
Xu et al.

(10) Patent No.: US 10,211,905 B2
(45) Date of Patent: Feb. 19, 2019

(54) SELECTING ANTENNA COMBINATION

(71) Applicant: Hewlett Packard Enterprise Development LP, Houston, TX (US)

(72) Inventors: Guoxiang Xu, Beijing (CN); Haitao Zhang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 59 days.

(21) Appl. No.: 15/504,271

(22) PCT Filed: Aug. 17, 2015

(86) PCT No.: PCT/CN2015/087198
§ 371 (c)(1),
(2) Date: Feb. 15, 2017

(87) PCT Pub. No.: WO2016/023525
PCT Pub. Date: Feb. 18, 2016

(65) Prior Publication Data
US 2017/0237480 A1    Aug. 17, 2017

(30) Foreign Application Priority Data

Aug. 15, 2014  (CN) .......................... 2014 1 0403647

(51) Int. Cl.
*H04B 7/08*       (2006.01)
*H04L 1/00*       (2006.01)
(Continued)

(52) U.S. Cl.
CPC ......... *H04B 7/0814* (2013.01); *H04B 17/318* (2015.01); *H04L 1/0002* (2013.01); *H04W 84/12* (2013.01)

(58) Field of Classification Search
CPC .... H04B 7/061; H04B 7/0805; H04B 7/0421; H04L 1/0001; H04L 1/0003; H04L 1/06; H04L 25/0204; H04L 1/0015
See application file for complete search history.

(56) References Cited

U.S. PATENT DOCUMENTS

2005/0037822 A1    2/2005  Regnier et al.
2007/0093282 A1*   4/2007  Chang ................. H04B 7/0608
                                                        455/575.7
(Continued)

FOREIGN PATENT DOCUMENTS

CN    101626615    1/2010
CN    101895325    11/2010
(Continued)

OTHER PUBLICATIONS

International Search Report and Written Opinion dated Oct. 21, 2015, PCT Patent Application No. PCT/CN2015/087198 dated Aug. 17, 2015, State Intellectual Property Office of the P.R. China.

*Primary Examiner* — Redentor Pasia
*Assistant Examiner* — Peter K Mak
(74) *Attorney, Agent, or Firm* — Hewlett Packard Enterprise Patent Department

(57) ABSTRACT

According to an example, an AP may obtain an influence index for each of antenna combinations, and determine antenna combinations whose influence indices are smaller than or equal to a pre-determined threshold to be valid antenna combinations. The antenna combinations may include antennas not more than the maximum number of transmitting links supported by the AP. Each influence index may indicate the influence of an antenna combination on default antenna combinations of neighboring APs operating on the same channel. The AP may adjust the available transmission rates supported by the AP according to the largest number of antennas in the valid antenna combina-
(Continued)

tions. The AP may select a transmission rate from the range for a frame, determine the number of antennas corresponding to the selected transmission rate, and select an antenna combination in which the number of antennas equals the determined number of antennas from the valid antenna combinations for transmitting the frame.

20 Claims, 3 Drawing Sheets

(51) Int. Cl.
*H04W 84/12* (2009.01)
*H04B 17/318* (2015.01)

(56) References Cited

U.S. PATENT DOCUMENTS

2008/0076383 A1* 3/2008 Barrett .................... E21F 17/18
455/404.1

2011/0028106 A1* 2/2011 Lee ........................ H04B 7/061
455/101
2012/0142295 A1 6/2012 Tseng et al.
2014/0099947 A1 4/2014 Sarca et al.
2015/0156731 A1* 6/2015 Ko ....................... H04W 52/246
455/411
2015/0223173 A1* 8/2015 Khojastepour ......... H04W 52/14
370/278
2015/0282063 A1* 10/2015 Patil ...................... H04W 48/20
370/329
2016/0029404 A1* 1/2016 Aryafar ............. H04W 72/1231
370/277

FOREIGN PATENT DOCUMENTS

| CN | 102006114 | 4/2011 |
| CN | 102324957 B | 1/2012 |
| CN | 102386954 | 3/2012 |
| CN | 102571182 B | 7/2012 |
| CN | 103346826 | 10/2013 |

* cited by examiner

SELECTING ANTENNA COMBINATION

BACKGROUND

In Wireless Local Area Networks (WLAN), an access point (AP) having a smart antenna means the AP has plural antennas. The AP may select a proper combination of antennas for frame transmission and reception by switching on selected antennas and switching off unselected antennas to obtain optimal performances of frame transmission and reception.

BRIEF DESCRIPTION OF THE DRAWINGS

Features of the present disclosure are illustrated by way of example and not limited in the following figures, in which like numerals indicate like elements, in which.

DETAILED DESCRIPTIONS

Figure 1:
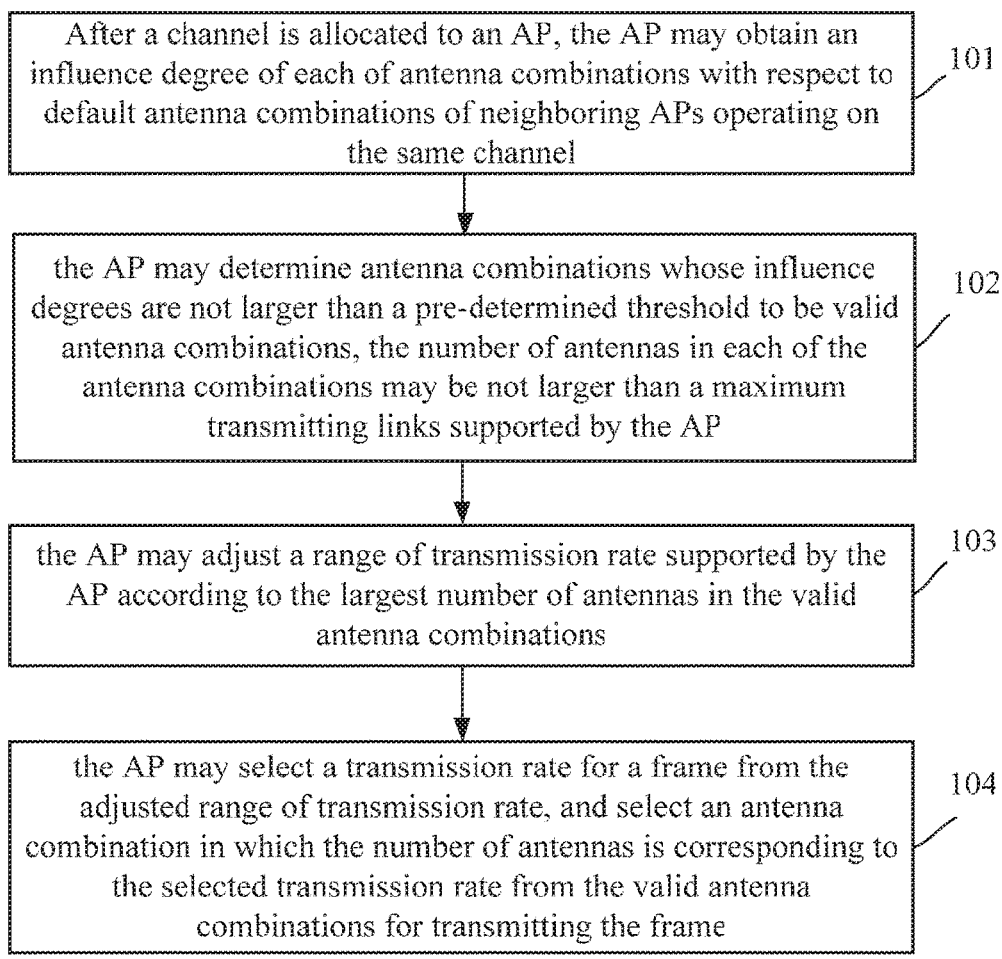
FIG. 1 is a flowchart illustrating a process in accordance with an example of the present disclosure.

For simplicity and illustrative purposes, the present disclosure is described by referring mainly to an example thereof. But not all examples are shown. Indeed, the technical mechanism may be embodied in many different forms and should not be construed as limited to the examples set forth herein. Rather, these examples are provided so that this disclosure will satisfy applicable legal requirements. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. Quantities of an element, unless specifically mentioned, may be one or a plurality of, or at least one.

In general access points have a limited range and so when a Wireless Area Network (WLAN) spans a large area a plurality of access points may be deployed. In this case the access points are generally relatively spread out and deployed at a distance from each other so as to minimize or reduce interference between the access points. However, each access point may be limited in the number of clients which it is able to support. When the number of clients associated with an access point is large, the quality of service to the clients by the access point may decrease. Therefore, where there are a large number of clients in a small area, a plurality of access points may be deployed in closer proximity to each other. This is known as a high density scenario. As the available channels in the WLAN may be limited, in high density scenario it is possible that neighboring access points may operate on the same channel. Thus, in high-density scenarios, APs may have a lot of overlapping coverage areas, and there may be severe interference between an AP and neighboring APs operating on the same channel. According to an example, an AP may obtain an influence index of each antenna combination, and determine antenna combinations whose influence indices are smaller than or equal to a pre-determined threshold to be valid antenna combinations. The influence index may refer to a value indicating influence of the antenna combination on default antenna combinations of neighboring APs operating on the same channel. The number of antennas in the antenna combinations may be smaller than or equal to the maximum number of transmitting links supported by the AP. The AP may adjust available transmission rates. When transmitting a frame, the AP may select a transmission rate from the adjusted available transmission rates, determine the number of antennas corresponding to the selected transmission rate, and select an antenna combination from the valid antenna combinations corresponding to the determined number of antennas for transmitting the frame. Various examples can reduce interference between an AP and neighboring APs operating on the same channel to make full use of the air.

The default antenna combination may be a pre-determined antenna combination which is used by default in situations where no antenna combination is selected. In an example, the default antenna combination may also be used by an AP for receiving transmission signals from a neighboring AP to measure parameters of the received signals. The measured parameters may be provided to the neighboring AP for determining an influence index by the neighboring AP. In an example, the default antenna combination may be an antenna combination having a pre-determined direction angle. In an example, the default antenna combination may be an antenna combination whose directionality resembles that of an omni directional antenna the most among various antenna combinations.

The influence index may be a value indicating the influence of transmitting signals of an antenna combination on one or multiple neighboring APs operating on the same channel. The influence index may be determined using measurement data fed back by the neighboring APs. The measurement data may be a signal strength, a received signal strength indication (RSSI) or the like obtained by measuring signals received from the AP by the neighboring APs.

Valid antenna combinations may be antenna combinations whose influence on neighboring APs is within an acceptable range, thus may be used for transmitting frames in subsequent procedures. In an example, when an influence index of an antenna combination is smaller than or equal to a pre-determined threshold, the AP may determine the influence of the antenna combination on neighboring APs is within the acceptable range.

As shown in FIG. 1, the method may include the following procedures.

At block 101, after a channel is allocated to an AP, the AP may obtain an influence index for each of antenna combinations of the AP. Each influence index may indicate the influence of an antenna combination on default antenna combinations of neighboring APs operating on the same channel.

At block 102, the AP may determine antenna combinations whose influence indices are smaller than or equal to a pre-determined threshold as valid antenna combinations. The number of antennas in each of the antenna combinations may be smaller than or equal to a maximum number of links supported by the AP. A link may also be referred to as a transmission chain.

In an example, the AP may obtain the influence index after all of APs have been allocated with channels. In an example, the AP may detect a neighboring AP operating on a channel by monitoring a beacon frame transmitted in the channel by the neighboring AP. In another example, the AP may detect a neighboring AP operating on a channel by transmitting a probe request in the channel.

The influence index may be a value obtained by calculating the sum of single influence indices of the antenna combination. A single influence index of an antenna combination may be a value indicating influence of the antenna combination on one of the neighboring APs operating on the same channel. The single influence index may be a non-decreasing function I of an RSSI of signals received by the default antenna combination of the neighboring AP when the AP transmits a pre-determined frame using the antenna combination at a pre-determined transmitting power.

In an example, the non-decreasing function may be, but not limited to, one of the following two functions: I=RSSI, or $$I = \begin{cases} 60 & RSSI \geq 35 \\ 35 & 35 > RSSI \geq 27 \\ 10 & 27 > RSSI \geq 23 \\ 0 & RSSI < 23 \end{cases},$$

as long as I has a non-decreasing characteristic with respect to RSSI.

At block 103, the AP may adjust available transmission rates supported by the AP according to the largest number of antennas in the valid antenna combinations.

Different numbers of antennas may correspond to different transmission rates of the AP. For example, given a bandwidth of 40 MHz and 802.11n, one antenna may be corresponding to a maximum transmission rate of 150 Mbps, two antennas may be corresponding to a maximum transmission rate of 300 Mbps, and three antennas may be corresponding to a maximum transmission rate of 450 Mbps. Therefore, supposing the AP may support a maximum of 3 transmitting links, the AP may support a maximum transmission rate of 450 Mbps. If the largest number of antennas in the valid antenna combinations is 2, the AP may select the valid antenna combination that has 2 antennas to attain the maximum transmission rate of 300 Mbps, and may adjust the available transmission rates supported by the AP to be 300 Mbps. Antenna combinations including 3 antennas are not valid, thus will not be selected.

At block 104, the AP may select a transmission rate for a frame from the adjusted available transmission rates, and select an antenna combination from valid antenna combinations including the number of antennas corresponding to the selected transmission rate.

The AP may select a transmission rate for transmitting the frame from the available transmission rates, and determine the number of antennas corresponding to the selected transmission rate. Then the AP may select an antenna combination from valid antenna combinations which have the same number of antennas with the determined number of antennas. In an example, the AP may select the maximum transmission rate from the adjusted available transmission rates. The selection of the antenna combination from the valid antenna combinations may be implemented using various algorithms which are not limited in the present disclosure, thus is not described further herein.

When the AP determines the valid antenna combinations according to the pre-determined threshold, the AP may find that influence indices of all of antenna combinations of a first number of antennas are larger than the pre-determined threshold. The AP may select an antenna combination that has the smallest influence index in all of the antenna combinations of the first number of antennas as a backup antenna combination.

Since the influence index of each antenna combination may change according to the environment, the influence index of a backup antenna combination may become smaller than the pre-determined threshold during the next periodic detection. In an example, the AP may set apart one or multiple backup antenna combinations, obtain the influence indices of the valid antenna combinations and the backup antenna combinations periodically, and then adjust the state of each of the antenna combinations so as to minimize the interference between the AP and neighboring APs operating on the same channel.

In an example, after a pre-determined time period since the valid antenna combinations and the backup antenna combination are determined, the AP may determine the valid antenna combinations and the backup antenna combination as candidate antenna combinations, and obtain the influence index of each candidate antenna combination again. The length of the pre-determined time period may be determined according to the operation condition or the application scenario. The AP may determine antenna combinations whose influence indices are not larger than the pre-determined threshold in the candidate antenna combinations as valid antenna combinations, and determine antenna combinations whose influence indices are larger than the pre-determined threshold in the candidate antenna combinations as backup antenna combinations. The AP may adjust the available transmission rates supported by the AP according to the largest number of antennas in the valid antenna combinations. As such, the state of valid antenna combinations and backup antenna combinations are monitored periodically by adjusting the valid antenna combinations at intervals according to the influence indices monitored, so as to minimize the interference between the AP and neighboring APs operating on the same channel.

In an example, the influence index of a candidate antenna combination may be the sum of single influence indices of the candidate antenna combination. A single influence index of the candidate may indicate the index of influence of the candidate antenna combination on a currently in use antenna combination of each neighboring APs operating on the same channel. In an example, the single influence index may be a non-decreasing function I of RSSI of a pre-determined frame received via an in use antenna combination of the neighboring AP operating on the same channel and transmitted by the AP using the candidate antenna combination at a pre-determined transmitting power. The non-decreasing function I may be one of the above two functions.

In an example, the AP may select an antenna combination that has the largest number of antennas and the smallest influence index in the valid antenna combinations for receiving a frame.

Figure 2:
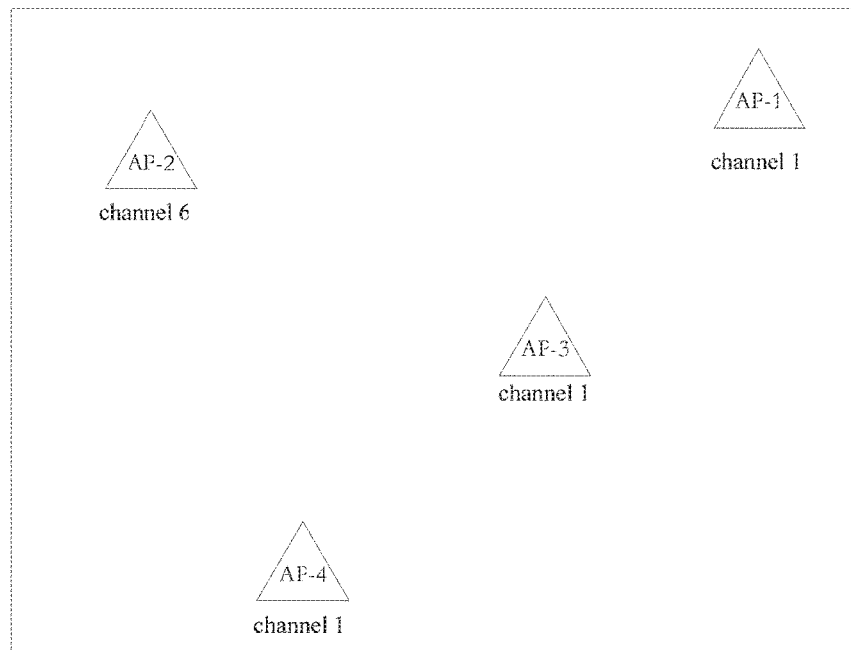
FIG. 2 is a schematic diagram illustrating a network including plural APs in accordance with an example of the present disclosure.

In an example, a network including plural APs may be as shown in FIG. 2. In FIG. 2, four APs may be deployed within a work area, i.e., AP-1, AP-2, AP-3, and AP-4. AP-1 may operate on channel 1, AP-2 may operate on channel 6, AP-3 may operate on channel 1, and AP-4 may operate on channel 1. The following takes the smart antenna selection of AP-3 as an example.

Figure 3:
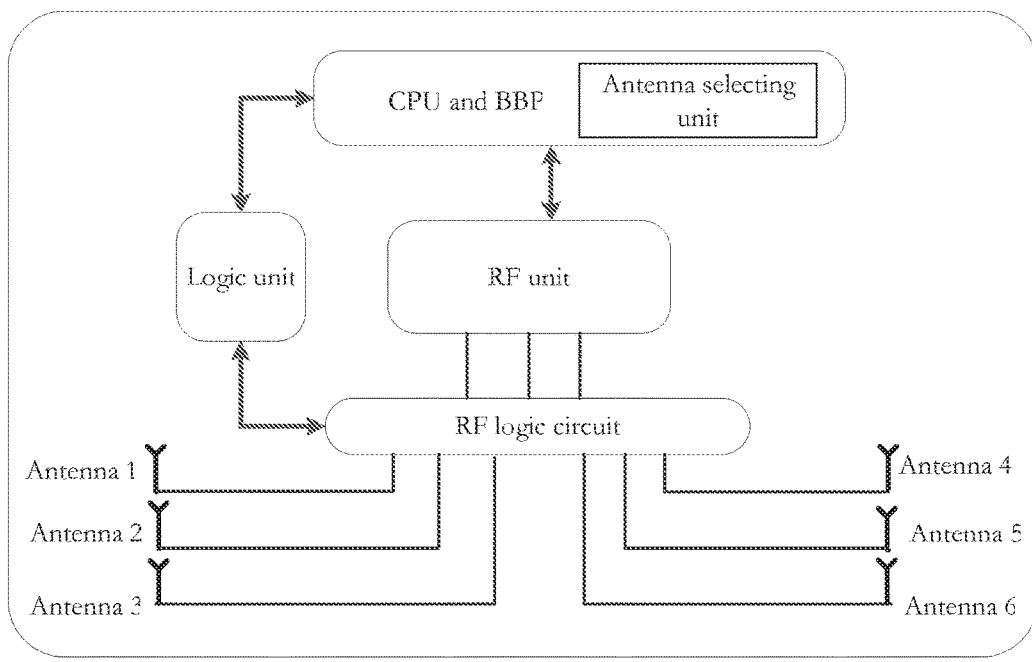
FIG. 3 is a schematic diagram illustrating the structure of an AP having a smart antenna in accordance with an example of the present disclosure.

FIG. 3 is a schematic diagram illustrating the structure of AP-3. As shown in FIG. 3, AP-3 may include a CPU and a base band processing (BBP) unit, a logic unit, a radio frequency (RF) unit, an RF logic circuit and 6 antennas which include antenna 1, antenna 2, antenna 3, antenna 4, antenna 5, and antenna 6. This is just an example and the access point may have any number of antennas as long as more than one. The CPU and the BBP unit may be implemented by one hardware module or different hardware modules. The CPU may include an antenna selecting unit. The antenna selecting unit is to select an antenna combination according to examples of the present disclosure. The selecting unit may be implemented in hardware or as machine readable instructions executable by a processor such as the CPU. The RF unit is to generate a RF signal to send wireless messages to client devices via the antennas in accordance with input from the CPU and/or BBP. The RF logic circuit may turn antennas on or off by connecting or disconnecting the antennas to the RF unit, for example by controlling switches of the RF links which connect the RF unit to the antennas. AP-3 may select a combination of any antennas using the switches controlled by the RF logic circuit. In an example, after selecting an antenna combination, the antenna selecting unit may control the RF logic circuit to switch on antennas in the selected antenna combination and switch off antennas not selected, so as to implement selection of the antenna combination.

Figure 4:
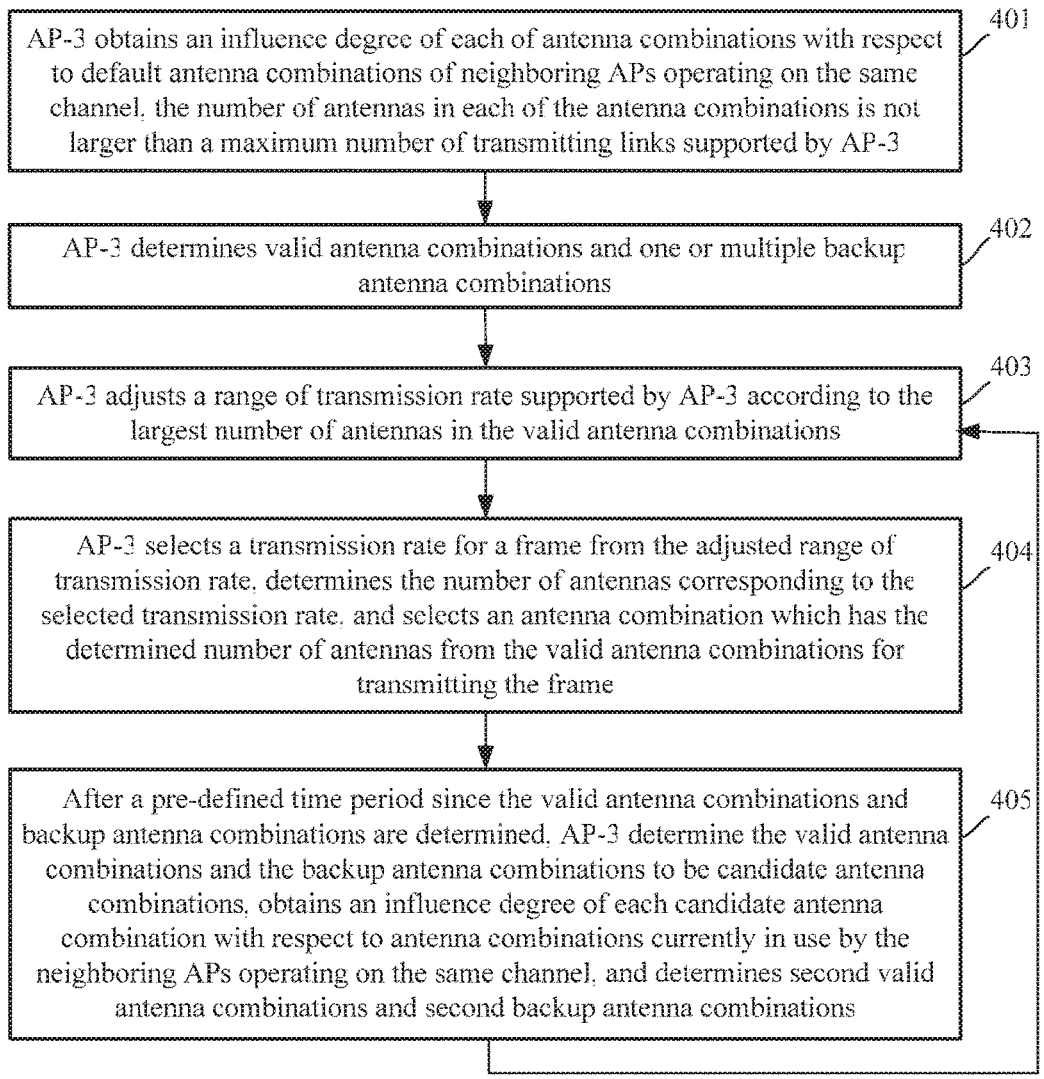
FIG. 4 is a flowchart illustrating a process in accordance with an example of the present disclosure.

The access point may have a maximum number of transmitting links M. In some examples the maximum number of transmitting links may be less than the number of antennas N possessed by the access point. The access point may also have a predetermined threshold for the maximum allowable influence index with respect to neighboring access points. In an example, the AP-3 has a total number of antennas N=6. Further, in this example, the maximum number of transmitting links supported by the RF unit of AP-3 may be Nmax=4, and the pre-determined threshold of AP-3 may be Imax=110. FIG. 4 is a flowchart illustrating a process in accordance with an example. The process may include the following procedures.

At block 401, AP-3 may test each of antenna combinations in which the number of antennas is not larger than the maximum number of transmitting links supported by the AP, and obtain an influence index of each of the antenna combinations. The influence index may be a value indicating influence of the antenna combination on default antenna combinations of neighboring APs operating on the same channel.

In the above example, AP-3 may have 6 antennas, and the maximum number of transmitting links supported by the RF unit may be Nmax=4. Therefore, AP-3 may have a total of 56 possible antenna combinations, i.e., 6 antenna combinations of one antenna. i.e., (1), (2), (3), (4), (5), (6);

15 antenna combinations of two antennas. i.e., (1-2), (1-3), (1-4), (1-5), (1-6), (2-3), (2-4), (2-5), (2-6), (3-4), (3-5), (3-6), (4-5), (4-6), (5-6);

20 antenna combinations of three antennas, i.e., (1-2-3), (1-2-4), (1-2-5), (1-2-6), (1-3-4), (1-3-5), (1-3-6), (1-4-5), (1-4-6), (1-5-6), (2-3-4), (2-3-5), (2-3-6), (2-4-5), (2-4-6), (2-5-6), (3-4-5), (3-4-6), (3-5-6), (4-5-6);

15 antenna combinations of four antennas, i.e., (1-2-3-4), (1-2-3-5), (1-2-3-6), (1-2-4-5), (1-2-4-6), (1-2-5-6), (1-3-4-5), (1-3-4-6), (1-3-5-6), (1-4-5-6), (2-3-4-5), (2-3-4-6), (2-3-5-6), (2-4-5-6), (3-4-5-6).

In an example, AP-1 may operate on channel 1, AP-2 may operate on channel 6, AP-3 may operate on channel 1, and AP-4 may operate on channel 1. Thus AP-3 operates on channel 1 and its neighboring APs, AP-1 and AP-4, also operate on channel 1. AP-3 may obtain the influence index of each of a plurality of antenna combinations in which the number of antennas does not exceed the maximum number of transmitting links supported by AP-3. In an example, the influence index may be the sum of single influence indices of an antenna combination with respect to the default antenna combination of each of neighboring APs operating on the same channel. That is, a single influence index indicates the influence of the access point on a single neighboring access point. In an example, the influence index of an antenna combination of AP-3 may be the sum of a first single influence index indicating the index of influence of the antenna combination on the default antenna combination of AP-1 and a second single influence index indicating the index of influence of the antenna combination on the default antenna combination of AP-4.

AP-3 may obtain a single influence index of an antenna combination with respect to the default antenna combination of a neighboring AP operating on the same channel according to the following method.

AP-3 may transmit a pre-determined frame using the antenna combination at a pre-determined transmitting power, and AP-1 and AP-4 may use respective default antenna combinations to receive the frame. AP-3 may obtain the RSSI of the frame received by the default antenna combinations of AP-1 and AP-4, and calculate the single influence indices of the antenna combination with respect to AP-1 and AP-4 according to the following formula:

$$I = \begin{cases} 60 & RSSI \geq 35 \\ 35 & 35 > RSSI \geq 27 \\ 10 & 27 > RSSI \geq 23 \\ 0 & RSSI < 23 \end{cases}$$

Taking the antenna combination (4-5) of AP-3 as an example, AP-3 may transmit the pre-determined frame at the minimum transmitting power. The RSSI of the frame received by a default antenna combination of AP-1 may be 40, and the RSSI of the frame received by a default antenna combination of AP-4 may be 35. The first single influence index of antenna combination (4-5) of AP-3 with respect to AP-1 may be I(1)=60, and the second single influence index of antenna combination (4-5) of AP-1 with respect to AP-4 may be I(4)=60.

Thus, the influence index of the antenna combination of AP-3 may be I3=I(1)+I(4)=120.

Influence indices of other antenna combinations of AP-3 may be obtained in a similar manner, and the process is not repeated herein. The influence indices obtained may be as shown in Table 1.

TABLE 1

| Antenna combination | | | | | | |
|---|---|---|---|---|---|---|
| | 1 | 2 | 3 | 4 | 5 | 6 |
| Influence index | 10 | 35 | 45 | 35 | 10 | 45 |

| Antenna combination | | | | | | |
|---|---|---|---|---|---|---|
| | 1-2 | 1-3 | 1-4 | 1-5 | 1-6 | 2-3 |
| Influence index | 45 | 35 | 10 | 95 | 45 | 70 |

| Antenna combination | | | | | | |
|---|---|---|---|---|---|---|
| | 2-4 | 2-5 | 2-6 | 3-4 | 3-5 | 3-6 |
| Influence index | 35 | 10 | 70 | 45 | 35 | 45 |

| Antenna combination | | | | | | |
|---|---|---|---|---|---|---|
| | 4-5 | 4-6 | 5-6 | 1-2-3 | 1-2-4 | 1-2-5 |
| Influence index | 45 | 35 | 10 | 60 | 70 | 45 |

| Antenna combination | | | | | | |
|---|---|---|---|---|---|---|
| | 1-2-6 | 1-3-4 | 1-3-5 | 1-3-6 | 1-4-5 | 1-4-6 |
| Influence index | 70 | 95 | 45 | 35 | 45 | 60 |

| Antenna combination | | | | | | |
|---|---|---|---|---|---|---|
| | 1-5-6 | 2-3-4 | 2-3-5 | 2-3-6 | 2-4-5 | 2-4-6 |
| Influence index | 120 | 95 | 45 | 120 | 95 | 45 |

| Antenna combination | | | | | | |
|---|---|---|---|---|---|---|
| | 2-5-6 | 3-4-5 | 3-4-6 | 3-5-6 | 4-5-6 | 1-2-3-4 |
| Influence index | 95 | 70 | 120 | 45 | 120 | 120 |

| Antenna combination | | | | | | |
|---|---|---|---|---|---|---|
| | 1-2-3-5 | 1-2-3-6 | 1-2-4-5 | 1-2-4-6 | 1-2-5-6 | 1-3-4-5 |
| Influence index | 120 | 120 | 120 | 120 | 120 | 120 |

| Antenna combination | | | | | | |
|---|---|---|---|---|---|---|
| | 1-3-4-6 | 1-3-5-6 | 1-4-5-6 | 2-3-4-5 | 2-3-4-6 | 2-3-5-6 |
| Influence index | 120 | 120 | 120 | 120 | 120 | 120 |

| Antenna combination | | |
|---|---|---|
| | 2-4-5-6 | 3-4-5-6 |
| Influence index | 120 | 120 |

At block 402, AP-3 may determine valid antenna combinations and one or multiple backup antenna combinations.

In an example, antenna combinations whose influence indices do not exceed the pre-determined threshold Imax may be determined to be the valid antenna combinations. If influence indices of all of antenna combinations including a first number of antennas are larger than Imax, the antenna combination having the smallest influence index in the antenna combinations having the first number of antennas may be determined as a backup antenna combination.

In an example, if the pre-determined threshold Imax is 110, the influence indices of the antenna combinations obtained in block 401 may be compared with Imax respectively.

Since influence indices of all of antenna combinations including one antenna are smaller than 110, all of the antenna combinations of one antenna may be determined to be valid antenna combinations. Likewise, all of the antenna combinations of two antennas may also be determined to be valid antenna combinations. Antenna combinations (1-5-6), (2-3-6), (3-4-6), (4-5-6) have influence indices of 120 which is larger than the Imax, thus the four antenna combinations do not satisfy the requirement of valid antenna combinations, and the rest of antenna combinations with three antennas may be determined as valid antenna combinations. Since influence indices of all of antenna combinations of four antennas are 120, larger than Imax, an antenna combination having the smallest influence index in the antenna combinations of four antennas may be determined as a backup antenna combination. If there are at least two antenna combinations which share the same smallest influence index, the AP may randomly select one of the at least two antenna combinations as the backup antenna combination.

In the above, example, the valid antenna combinations and backup antenna combinations determined may be as follows.

Valid antenna combinations may include:
antenna combinations of one antenna (1), (2), (3), (4), (5), (6);
antenna combinations of two antennas (1-2), (1-3), (1-4), (1-5), (1-6), (2-3), (2-4), (2-5), (2-6), (3-4), (3-5), (3-6), (4-5), (4-6), (5-6);
antenna combinations of three antennas (1-3-6), (1-2-5), (1-3-5), (1-4-5), (2-3-5), (2-4-6), (3-5-6), (1-2-3), (1-4-6), (1-2-4), (1-2-6), (3-4-5), (1-3-4), (2-3-4), (2-4-5), (2-5-6);
Backup antenna combinations may include:
antenna combination of four antennas (1-2-3-4).

At block 403, AP-3 may adjust available transmission rates supported by AP-3 according to the largest number of antennas in the valid antenna combinations.

In an example, the largest number of antennas in valid antenna combinations may be obtained. In the above example of block 402, the valid antenna combinations may include antenna combinations of one antenna, antenna combinations of two antennas and antenna combinations of three antennas. Thus, the largest number of antennas in the valid antenna combinations is 3. AP-3 may determine that at most 3 antennas may be selected when the RF unit is to transmit a frame. The transmission rate of a frame may be corresponding to the number of antennas selected for transmitting the frame. In an example, given a bandwidth of 40 MHz and 802.11n, one antenna may correspond to a maximum transmission rate of 150 Mbps, two antennas may correspond to a maximum transmission rate of 300 Mbps, and three antennas may correspond to a maximum transmission rate of 450 Mbps. In the example, AP-3 may determine the maximum transmission rate is 450 Mbps.

In theory, AP-3 may support at most 4 transmitting links, and is capable of transmitting a frame using an antenna combination of 4 antennas which generates a transmission rate larger than the transmission rate of 3 antennas. But according to various examples, all of antenna combinations of 4 antennas of AP-3 may have an influence index larger than the pre-determined threshold which indicates the influence on default antenna combinations of neighboring APs operating on the same channel are unacceptable. Thus, AP-3 may discard antenna combinations of 4 antennas, and use an antenna combination which includes at most 3 antennas to minimize the interference between APs operating on the same channel.

At block 404, AP-3 may select a transmission rate for a frame from the available transmission rates, and select an antenna combination from valid antenna combinations in which the number of antennas is corresponding to the selected transmission rate.

AP-3 may select a transmission rate for a frame from the available transmission rates adjusted in block 403, determine the number of antennas corresponding to the selected transmission rate, and select an antenna combination including the determined number of antennas from valid antenna combinations determined in block 402 for transmitting the frame.

For example, AP-3 may select the maximum transmission rate 450 Mbps in the available transmission rates, determine the number of antennas corresponding to the transmission rate is 3, and select a valid antenna combination which includes 3 antennas from the valid antenna combinations determined in block 402 for transmitting a frame.

In an example, AP-3 may select a valid antenna combination that has the largest number of antennas and the smallest influence index for receiving a frame. In the above example, AP-3 may select the antenna combination (1-3-6).

At block 405, after a pre-determined time period since the valid antenna combinations and the backup antenna combination are determined, AP-3 may determine the valid antenna combinations and the backup antenna combination as candidate antenna combinations, obtain an influence index of each of the candidate antenna combinations with respect to currently in use antenna combinations of neighboring APs operating on the same channel, and determine new valid antenna combinations and new backup antenna combinations according to the influence indices.

In an example, AP-3 may start timing when the valid antenna combinations and the backup antenna combination are determined. When the pre-determined time period elapsed. AP-3 may determine the valid antenna combinations and the backup antenna combination to be candidate antenna combinations, and repeat the procedure of obtaining the influence index for each of the candidate antenna combinations with respect to the currently in use antenna combinations of neighboring APs operating on the same channel. Since this procedure is for monitoring changes in interference caused by each antenna combination of AP-3 to neighboring APs operating on the same channel during normal working process, the neighboring APs may use respective currently in use antenna combinations for receiving the pre-determined frame transmitted by AP-3.

After the obtaining procedure, candidate antenna combinations whose influence indices are not larger than the pre-determined threshold may be determined to be valid antenna combinations, and candidate antenna combinations whose influence indices are larger than the threshold may be determined to be backup antenna combinations. Then the procedure in block 403 may be performed.

According to various examples, an AP may determine valid antenna combinations and backup antenna combinations, adjust available transmission rates supported by the AP according to the largest number of antennas in the valid antenna combinations, select a transmission rate from the available transmission rates, determine the number of antennas corresponding to the selected transmission rate, and select an antenna combination from the valid antenna combinations in which the number of antennas equals the determined number of antennas for transmitting a frame. According to various examples, an AP may only consider antenna combinations whose influence indices are smaller than or equal to a pre-determined threshold as valid antenna combinations, and discard antenna combinations whose influence indices are larger than the threshold, so as to minimize the interference of the selected antenna combination to neighboring APs operating on the same channel.

Figure 5:
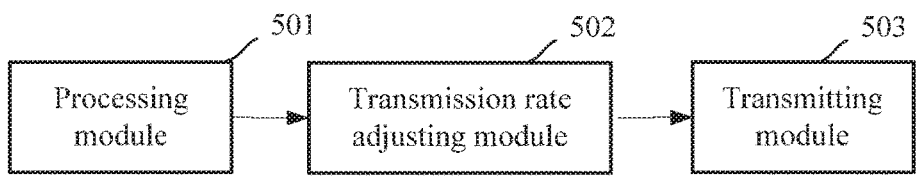
FIG. 5 is a schematic diagram illustrating the structure of an AP in accordance with an example of the present disclosure.

Various examples also provide an AP. FIG. 5 is a schematic diagram illustrating the structure of an AP. The AP may include the following modules.

A processing module 501 may obtain an influence index for each of antenna combinations of the AP after a channel is allocated to the AP, and determine antenna combinations whose influence indices are smaller than or equal to a pre-determined threshold as valid antenna combinations. The number of antennas in the antenna combinations may be smaller than or equal to a maximum number of transmission chains supported by the AP. Each influence index may indicate the influence of an antenna combination on default antenna combinations of neighboring APs operating on the same channel.

A transmission rate adjusting module 502 may adjust available transmission rates supported by the AP according to the largest number of antennas in the valid antenna combinations.

A transmitting module 503 may select a transmission rate for a frame from the available transmission rates, and select an antenna combination from the valid antenna combinations in which the number of antennas is corresponding to the selected transmission rate.

In an example, the processing module 501 may determine an antenna combination which has the smallest influence index in antenna combinations having a first number of antennas as a backup antenna combination when influence indices of the antenna combinations having the first number of antennas are larger than the threshold.

In an example, the processing module 501 may determine the valid antenna combinations and the backup antenna combination as candidate antenna combinations after a pre-determined time period since the valid antenna combinations and the backup antenna combination are determined, obtain a second influence index for each of the candidate antenna combinations, determine candidate antenna combinations whose influence indices are smaller than or equal to the pre-determined threshold as second valid antenna combinations, and determine candidate antenna combinations whose influence indices are larger than the pre-determined threshold as second backup antenna combinations. Each second influence index may indicate the influence of a candidate antenna combination on in use antenna combinations of the neighboring APs operating on the same channel. The processing module 501 may instruct the transmission rate adjusting module 502 to determine the largest number of antennas in the second valid antenna combinations and adjust the available transmission rates according to the largest number of antennas.

The influence index obtained by the processing module 501 may be the sum of single influence indices of the influence of an antenna combination on each of default antenna combinations of neighboring APs operating on the same channel. In an example, a single influence index may be a non-decreasing function I of a frame transmitted by the AP using the antenna combination at a pre-determined transmitting power and received by a neighboring AP using a default antenna combination.

In an example, the influence index of a candidate antenna combination obtained by the processing module 501 may be the sum of single influence indices each of which indicates the influence of the candidate antenna combination on each of in use antenna combinations of neighboring APs operating on the same channel. In an example, a single influence index of a candidate antenna combination may be a non-decreasing function I of RSSI of a frame transmitted by the AP using the candidate antenna combination at a pre-determined transmitting power and received by a neighboring AP using a default antenna combination.

The processing module 501 may obtain the single influence index by using a non-decreasing function I=RSSI, or $$I = \begin{cases} 60 & RSSI \geq 35 \\ 35 & 35 > RSSI \geq 27 \\ 10 & 27 > RSSI \geq 23 \\ 0 & RSSI < 23 \end{cases}.$$

According to various examples, an access point may include:

a plurality of antennas; and a processor to select an antenna combination of said plurality of antennas to use for communicating with wireless client devices.

The processor is to determine the influence of each antenna combination on one or more neighboring access points; and select an antenna combination based on a transmission rate of the antenna combination and an influence of the antenna combination on the one or more neighboring access points.

In an example, the processor is to determine the influence of an antenna combination on the one or more neighboring access points based on a received signal strength indication (RSSI) of a signal from the access point received by a neighboring access point.

In an example, the processor is to select an antenna combination for which the influence on neighboring access points is equal to or below a predetermined threshold.

In an example, the access point has N antennas and is capable of supporting a maximum number of links M, and wherein in response to determining that all antenna combinations having M antennas have an influence on neighboring access points above the predetermined threshold, adjust the bandwidth of the access point downward.

In an example, the access point is capable of supporting a plurality of bandwidths, each bandwidth corresponding to a particular number of antennas, and wherein the processor is to select a bandwidth for the access point corresponding to a number of antennas for which there is a combination of antennas which has an influence on neighboring access points equal to or below the predetermined threshold.

It should be understood that in the above processes and structures, not all of the procedures and modules are necessary. Certain procedures or modules may be omitted according to the needs. The order of the procedures is not fixed, and can be adjusted according to the needs. The modules are defined based on function simply for facilitating description. In implementation, a module may be implemented by multiple modules, and functions of multiple modules may be implemented by the same module. The modules may reside in the same device or distribute in different devices. The "first", "second" in the above descriptions are merely for distinguishing two similar objects, and have no substantial meanings.

In various examples, the hardware may be dedicated hardware or general-purpose hardware executing machine-readable instructions. For example, a hardware module may comprise dedicated circuitry or logic that is permanently configured (e.g., as a special-purpose processor, such as a field programmable gate array (FPGA) or an application-specific integrated circuit (ASIC)) to perform certain operations.

A module may also comprise programmable logic or circuitry (e.g., as encompassed within a general-purpose processor or other programmable processor) that is temporarily configured by machine-readable instructions to perform certain operations.

The machine-readable instructions may cause an operating system running in a computer to implement part or all of the operations described herein. A non-statutory computer-readable storage medium may be a storage device in an extension board inserted in the computer or a storage in an extension unit connected to the computer. In this example, a CPU in the extension board or the extension unit executes at least part of the operations according to the instructions based on the program codes to realize the technical scheme of any of the above examples.

The non-statutory computer-readable storage medium for providing the program codes may include floppy disk, hard drive, magneto-optical disk, compact disk (such as CD-ROM, CD-R. CD-RW, DVD-ROM, DVD-RAM, DVD-RW, DVD+RW), magnetic tape drive, Flash card, ROM and so on. Optionally, the program code may be downloaded from a server computer via a communication network.

The invention claimed is:

1. A method of selecting an antenna combination in a smart antenna, comprising:
    obtaining, by an AP, an influence index indicating influence for each of a plurality of antenna combinations of the AP, wherein each antenna combination includes a number of antennas that is smaller than or equal to a maximum number of transmission links supported by the AP and wherein the influence index of an antenna combination is a sum of single influence indices each of which indicates influence of the antenna combination on a default antenna combination of each of neighboring APs, the single influence index is a non-decreasing function I of a received signal strength indication (RSSI) of a frame transmitted by the AP using the antenna combination at a pre-determined transmitting power and received by one of the neighboring APs using a default antenna combination and each influence index indicates the influence of an antenna combination on default antenna combinations of neighboring APs operating on a same channel;
    determining, by the AP, antenna combinations whose influence indices are smaller than or equal to a pre-determined threshold as valid antenna combinations;
    adjusting, by the AP, available transmission rates supported by the AP according to a largest number of antennas in the valid antenna combinations whose influence indices are smaller than or equal to the pre-determined threshold; and
    selecting, by the AP, a transmission rate for a frame from the available transmission rates, and selecting an antenna combination from the valid antenna combinations in which the number of antennas corresponds to the selected transmission rate.

2. The method of claim 1, further comprising:
    determining, by the AP, an antenna combination which has the smallest influence index in antenna combinations having a first number of antennas as a backup antenna combination when influence indices of the antenna combinations having the first number of antennas are larger than the threshold.

3. The method of claim 2, further comprising:
- determining, by the AP, the valid antenna combinations and the backup antenna combination as candidate antenna combinations after a pre-determined time period since the valid antenna combinations and the backup antenna combination are determined;
- obtaining, by the AP, a second influence index for each of the candidate antenna combinations, wherein each second influence index indicates the influence of a candidate antenna combination on antenna combinations that are in use by the neighboring APs operating on the same channel; and
- determining candidate antenna combinations whose second influence indices are smaller than or equal to the pre-determined threshold as second valid antenna combinations, determining a candidate antenna combination whose second influence index is larger than the threshold as a second backup antenna combination, and adjusting the available transmission rates according to the largest number of antennas in the second valid antenna combinations whose second influence indices are smaller than or equal to the pre-determined threshold.

4. The method of claim 3, wherein the second influence index of a candidate antenna combination is the sum of single influence indices each of which indicates influence of the candidate antenna combination on an antenna combination in use by each of the neighboring APs, the single influence index is a non-decreasing function I of a received signal strength indication (RSSI) of a frame transmitted by the AP using the candidate antenna combination at a pre-determined transmitting power and received by an antenna combination that is in use by one of the neighboring APs.

5. The method of claim 4, wherein the non-decreasing function I is I=RSSI, or $$I = \begin{cases} 60 & RSSI \geq 35 \\ 35 & 35 > RSSI \geq 27 \\ 10 & 27 > RSSI \geq 23 \\ 0 & RSSI < 23 \end{cases}.$$

6. The method of claim 1, wherein the non-decreasing function I is I=RSSI, or $$I = \begin{cases} 60 & RSSI \geq 35 \\ 35 & 35 > RSSI \geq 27 \\ 10 & 27 > RSSI \geq 23 \\ 0 & RSSI < 23 \end{cases}.$$

7. A wireless access point (AP), comprising a processor and machine-readable storage medium; the machine-readable storage medium storing machine-readable instructions executable by the processor to:
- obtain an influence index of each of antenna combination of a plurality of antenna combinations of the AP, and determine antenna combinations whose influence indices are smaller than or equal to a pre-determined threshold as valid antenna combinations, wherein each antenna combination includes a number of antennas that is smaller than or equal to a maximum number of transmission links supported by the AP and wherein each influence index indicates an influence of an antenna combination on default antenna combinations of neighboring APs operating on a same channel;
- determine an antenna combination which has a smallest influence index in second antenna combinations as a backup antenna combination when influence indices of the second antenna combinations are larger than a threshold, wherein each of the second antenna combinations includes a first number of antennas;
- adjust available transmission rates supported by the AP according to a largest number of antennas in the valid antenna combinations whose influence indices are smaller than or equal to the pre-determined threshold;
- select a transmission rate for a frame from the available transmission rates, and select an antenna combination from the valid antenna combinations in which the number of antennas corresponds to the selected transmission rate and
- determine the valid antenna combinations and the backup antenna combination to be candidate antenna combinations after a pre-determined time period since the valid antenna combinations and the backup antenna combination are determined, obtain a second influence index for each of the candidate antenna combinations, determine candidate antenna combinations whose second influence indices are smaller than or equal to the pre-determined threshold as second valid antenna combinations, and determine a candidate antenna combination whose influence index is larger than the pre-determined threshold as a second backup antenna combinations, determine the largest number of antennas in the second valid antenna combinations whose second influence indices are smaller than or equal to the pre-determined threshold and adjust the available transmission rates according to the largest number of antennas, wherein each second influence index indicates the influence of a candidate antenna combination on antenna combinations in use by the neighboring APs.

8. The AP of claim 7, wherein the second influence index of a candidate antenna combination is the sum of single influence indices indicating influence of the candidate antenna combination on each of default antenna combinations of the neighboring APs, the single influence index is a non-decreasing function I of a received signal strength indication (RSSI) of a frame transmitted by the AP using the candidate antenna combination at a pre-determined transmitting power and received by one of the neighboring APs using an antenna combination.

9. The AP of claim 8, wherein the non-decreasing function I is I=RSSI, or $$I = \begin{cases} 60 & RSSI \geq 35 \\ 35 & 35 > RSSI \geq 27 \\ 10 & 27 > RSSI \geq 23 \\ 0 & RSSI < 23 \end{cases}.$$

10. The AP of claim 7, wherein the influence index of an antenna combination is the sum of single influence indices indicating influence of the antenna combination on each of default antenna combinations of the neighboring APs, the single influence index is a non-decreasing function I of a received signal strength indication (RSSI) of a frame transmitted by the AP using the antenna combination at a pre-determined transmitting power and received by one of the neighboring APs using a default antenna combination.

11. The AP of claim 10, wherein the non-decreasing function I is I=RSSI, or $$I = \begin{cases} 60 & RSSI \geq 35 \\ 35 & 35 > RSSI \geq 27 \\ 10 & 27 > RSSI \geq 23 \\ 0 & RSSI < 23 \end{cases}.$$

12. A non-transitory machine-readable storage medium, comprising machine-readable instructions executable by a processor to:
   obtain an influence index for each of antenna combinations of an AP, and determine antenna combinations whose influence indices are smaller than or equal to a pre-determined threshold as valid antenna combinations, wherein each of the antenna combinations include a number of antennas that is smaller than or equal to a maximum number of transmission chains supported by the AP and wherein each influence index indicates an influence of an antenna combination on default antenna combinations of neighboring APs operating on a same channel;
   determine an antenna combination which has a smallest influence index in second antenna combinations as a backup antenna combination when influence indices of the second antenna combinations are larger than a threshold, wherein each of the second antenna combinations includes a first number of antennas
   adjust available transmission rates supported by the AP according to a largest number of antennas in the valid antenna combinations whose influence indices are smaller than or equal to the pre-determined threshold;
   select a transmission rate for a frame from the available transmission rates, and select an antenna combination from the valid antenna combinations in which the number of antennas is corresponding to the selected transmission rate and
   determine the valid antenna combinations and the backup antenna combination to be candidate antenna combinations after a pre-determined time period since the valid antenna combinations and the backup antenna combination are determined, obtain a second influence index for each of the candidate antenna combinations, determine candidate antenna combinations whose second influence indices are smaller than or equal to the pre-determined threshold as second valid antenna combinations, and determine a candidate antenna combination whose influence index is larger than the pre-determined threshold as a second backup antenna combinations, determine the largest number of antennas in the second valid antenna combinations whose second influence indices are smaller than or equal to the pre-determined threshold and adjust the available transmission rates according to the largest number of antennas, wherein each second influence index indicates the influence of a candidate antenna combination on antenna combinations in use by the neighboring APs.

13. The machine-readable storage medium of claim 12, wherein the influence index of an antenna combination is the sum of single influence indices indicating influence of the antenna combination on each of default antenna combinations of the neighboring APs, the single influence index is a non-decreasing function I of a received signal strength indication (RSSI) of a frame transmitted by the AP using the antenna combination at a pre-determined transmitting power and received by one of the neighboring APs using a default antenna combination.

14. The machine-readable storage medium of claim 13, wherein the non-decreasing function I is I=RSSI, or $$I = \begin{cases} 60 & RSSI \geq 35 \\ 35 & 35 > RSSI \geq 27 \\ 10 & 27 > RSSI \geq 23 \\ 0 & RSSI < 23 \end{cases}.$$

15. The machine-readable storage medium of claim 12, wherein the second influence index of a candidate antenna combination is the sum of single influence indices indicating influence of the candidate antenna combination on each of default antenna combinations of the neighboring APs, the single influence index is a non-decreasing function I of a received signal strength indication (RSSI) of a frame transmitted by the AP using the candidate antenna combination at a pre-determined transmitting power and received by one of the neighboring APs using an antenna combination.

16. The machine-readable storage medium of claim 15, wherein the non-decreasing function I is I=RSSI, or $$I = \begin{cases} 60 & RSSI \geq 35 \\ 35 & 35 > RSSI \geq 27 \\ 10 & 27 > RSSI \geq 23 \\ 0 & RSSI < 23 \end{cases}.$$

17. An access point comprising:
   a plurality of antennas; and
   a processor to select an antenna combination of said plurality of antennas to use for communicating with wireless client devices;
   wherein the processor is to determine an influence of each antenna combination on one or more neighboring access points;
   select an antenna combination based on a transmission rate of the antenna combination and the influence of the antenna combination on the one or more neighboring access points
   wherein the access point is capable of supporting a plurality of bandwidths, each bandwidth corresponding to a particular number of antennas, and wherein the processor is to select a bandwidth for the access point corresponding to a number of antennas for which there is a combination of antennas which has an influence on neighboring access points equal to or below a predetermined threshold.

18. The access point of claim 17 wherein the processor is to determine the influence of an antenna combination on the one or more neighboring access points based on a received signal strength indication (RSSI) of a signal from the access point received by a neighboring access point.

19. The access point of claim 17, wherein the processor is to select an antenna combination for which the influence on neighboring access points is equal to or below a predetermined threshold.

20. The access point of claim 17 wherein the access point has N antennas and is capable of supporting a maximum number of links M, and wherein in response to determining that all antenna combinations having M antennas have an influence on neighboring access points above the predetermined threshold, adjust the bandwidth of the access point downward.

* * * * *